US012683499B2

(12) United States Patent
Floriani

(10) Patent No.: US 12,683,499 B2
(45) Date of Patent: Jul. 14, 2026

(54) CONTROL DEVICE FOR A SWITCHING VOLTAGE REGULATOR AND CONTROL METHOD

(71) Applicant: STMicroelectronics International N.V., Geneva (CH)

(72) Inventor: Ivan Floriani, Milan (IT)

(73) Assignee: STMicroelectronics International N.V., Geneva (CH)

( * ) Notice: Subject to any disclaimer, the term of this patent is extended or adjusted under 35 U.S.C. 154(b) by 197 days.

(21) Appl. No.: 18/769,760

(22) Filed: Jul. 11, 2024

(65) Prior Publication Data

US 2025/0079993 A1 Mar. 6, 2025

(30) Foreign Application Priority Data

Aug. 28, 2023 (IT) ........................ 102023000017658

(51) Int. Cl.
| | |
|---|---|
| *H02M 3/158* | (2006.01) |
| *H02M 1/00* | (2006.01) |
| *H02M 1/08* | (2006.01) |

(52) U.S. Cl.
CPC ....... *H02M 3/1582* (2013.01); *H02M 1/0025* (2021.05); *H02M 1/08* (2013.01)

(58) Field of Classification Search
CPC ..... H02M 3/1582; H02M 1/0025; H02M 1/08
See application file for complete search history.

(56) References Cited

U.S. PATENT DOCUMENTS

| | | | | |
|---|---|---|---|---|
| 10,243,463 B2 * | 3/2019 | Sun | ...................... | H02M 3/1582 |
| 10,978,947 B2 * | 4/2021 | Amin | .................... | H02M 3/158 |
| 11,616,443 B2 * | 3/2023 | Lien | .................... | H02M 3/1582 |
| | | | | 323/271 |
| 2017/0207703 A1 * | 7/2017 | Houston | ............. | H02M 3/1582 |

(Continued)

FOREIGN PATENT DOCUMENTS

| | | |
|---|---|---|
| CN | 111262435 A | 6/2020 |
| EP | 4113815 A1 | 1/2023 |
| EP | 4297258 A1 | 12/2023 |

OTHER PUBLICATIONS

Mao, Tianhao et al., "Soft Switching Control Strategy of Four-Switch Buck-Boost Converter for High Efficiency," 2022 IEEE International Power Electronics and Application Conference and Exposition (PEAC), IEEE, Nov. 4-7, 2022, 7 pages.

*Primary Examiner* — Rafael O De Leon Domenech
(74) *Attorney, Agent, or Firm* — Slater Matsil, LLP

(57) ABSTRACT

The control device for a regulator with a switching circuit. The device includes an oscillator that provides a clock signal having a switching period; a circuit that provides a comparison signal indicative of a comparison between an input voltage and an output voltage; and a circuit that generates a signal to drive the switches of the switching circuit as a function of an error between the output voltage and a nominal voltage. The device controls, within the switching period, a first phase having a current path between the input and output node through the inductive element; a second phase having a current path between the input and common node through the inductive element; and a third phase having a current path between the output and common node through the inductive element. The sequence of the first, second, and third phases is a function of the comparison signal.

20 Claims, 12 Drawing Sheets

(56) References Cited

U.S. PATENT DOCUMENTS

| | | | |
|---|---|---|---|
| 2017/0257031 A1* | 9/2017 | Shao | H02M 3/1582 |
| 2021/0067041 A1 | 3/2021 | Cho et al. | |
| 2022/0209763 A1* | 6/2022 | Poletto | H02M 3/156 |
| 2023/0421039 A1 | 12/2023 | Castorina et al. | |

* cited by examiner

CONTROL DEVICE FOR A SWITCHING VOLTAGE REGULATOR AND CONTROL METHOD

CROSS-REFERENCE TO RELATED APPLICATIONS

This application claims priority to Italian Application No. 102023000017658, filed on Aug. 28, 2023, which application is hereby incorporated by reference herein in its entirety.

TECHNICAL FIELD

The present invention relates to a control device for a switching voltage regulator and to a control method.

BACKGROUND

As known, a switching voltage regulator is capable of converting an input direct voltage (DC) into an output direct voltage using different operating schemes and may be obtained using different topologies, of which one of the most widespread is the four-switch non-inverting topology.

FIG. 1 shows a switching voltage regulator 1 comprising a four-switch non-inverting switching circuit, hereinafter referred to as switching circuit 3, and a control device 5. The switching circuit 3 is formed by a first half-bridge 7, a second half-bridge 9, and an inductor 10.

The first half-bridge 7 is formed by a first high-side switch 11 and a first low-side switch 13, here two N-MOS transistors, coupled in series between an input terminal 15 and a common node 17. The common node 17 is coupled to a reference potential line (ground) 18 through a shunt resistor 19. An input voltage Vin with respect to the ground 18 is applied to the input terminal 15.

The second half-bridge 9 is formed by a second high-side switch 20 and a second low-side switch 22, also here two N-MOS transistors, coupled in series between an output node 24 and the common node 17.

An output voltage Vout, referenced to ground 18, is present at the output node 24 and is applied to a load 25.

An input capacitor 26, on which the input voltage $V_{in}$ drops, is coupled to the input terminal 15. An output capacitor 27, on which the output voltage $V_{out}$ drops, is coupled to the output terminal 24.

The inductor 10 is coupled between an intermediate node of the first half-bridge 7 and an intermediate node of the second half-bridge 9.

As a function of the ratio between the input voltage $V_{in}$ and the output voltage $V_{out}$, the switching voltage regulator 1 may work in one of three operating modes also known as "buck" mode if $V_{in} > V_{out} + V_{th1}$, "boost" mode if $V_{in} < V_{out} - V_{th2}$, and transition or "buck-boost" mode if $V_{in} \approx V_{out}$ (i.e., if $V_{out} + V_{th1} < V_{in} < V_{out} - V_{th2}$).

According to the operating mode, by suitably controlling the switching of the first and the second half-bridges 7, 9, it is possible to maintain the output voltage $V_{out}$ at a reference voltage $V_{ref}$ chosen, for example, by a user according to a specific application, regardless of the value of the input voltage $V_{in}$.

For this purpose, the control device 5 is coupled to the input node 15 and the output node 24 and receives the reference voltage $V_{ref}$. Furthermore, the control device 5 is coupled to the shunt resistor 19 to operate a current control of the switching circuit 3.

In the buck mode, FIGS. 2A and 2B, the control device generates a signal PWM having a variable duty cycle within a switching period $T_{CLK}$ of a clock signal CLK.

The signal PWM defines a buck ON-phase and a buck OFF-phase. The buck OFF-phase precedes the buck ON-phase. In the OFF-phase, the control device 5 controls the closing of the first low-side switch 13 and the second high-side switch 20; and the opening of the first high-side switch 11 and the second low-side switch 22. In practice, during the buck OFF-phase, a current flows into the switching circuit 3 through a current path 30 (indicated by a dash-dot line in FIG. 2A) between the ground 18 and the output terminal 24, through the inductor 10.

In the ON-phase, the control device 5 controls the opening of the first low-side switch 13 and the second low-side switch 22; and the closing of the first high-side switch 11 and the second high-side switch 20. In practice, during the buck ON-phase, a current flows into the switching circuit 3 through a current path 31 (indicated by a dashed line in FIG. 2A) between the input terminal 15 and the output terminal 24, through the inductor 10.

In the boost mode, FIGS. 3A and 3B, the control device 5 modifies the duty cycle of the signal PWM, within a period TALK of the clock signal CLK, defining a boost ON-phase and a boost OFF-phase. The boost ON-phase precedes the boost OFF-phase. In the ON-phase, the control device 5 controls the closing of the first high-side switch 11 and the second low-side switch 22; and the opening of the first low-side switch 13 and the second high-side switch 20. In practice, during the boost ON-phase, a current flows into the switching circuit 3 through a current path 33 (indicated by a dashed line in FIG. 3A) between the ground 18 and the input terminal 15, through the inductor 10.

In the OFF-phase, the control device 5 controls the closing of the first high-side switch 11 and the second high-side switch 20; and the opening of the first low-side switch 13 and the second low-side switch 22. In practice, during the boost OFF-phase, a current flows into the switching circuit 3 through a current path 34 (indicated by a dash-point line in FIG. 3A) between the input terminal 15 and the output terminal 24, through the inductor 10.

In the transition mode, FIG. 4, the control device 5 alternates within a switching period TCLK of the clock signal CLK, a boost cycle, and a buck cycle. In practice, the control device 5 alternates, within a switching period $T_{CLK}$, the four control phases described with reference to FIGS. 2B and 3B. In the transition mode, the switching frequency is therefore halved with respect to that obtainable in buck and boost modes. Consequently, the control device 5 has, in the transition mode, a reduced control efficiency in regulating the output voltage $V_{out}$ to the desired value. In fact, in the transition mode, the maximum duration of the ON-phase of the boost cycle cannot be higher than half the duration of the clock period $T_{CLK}$.

Furthermore, the choice of the voltage thresholds $V_{th1}$, $V_{th2}$, which define the voltage range in which the regulator 1 is in transition mode, requires complex design. In addition, the Applicant has verified that, when entering and exiting the transition mode, for example when passing from the transition mode (FIG. 4) to the boost mode (FIGS. 3A and 3B) and vice versa, the control device 5 may be subject to high current peaks due to different working points (values of the control node) between the transition mode and the buck (or boost) mode. Such high current peaks may cause malfunctions of the regulator 1.

SUMMARY

According to the present invention a control device for a switching voltage regulator, a control method and a voltage regulator are therefore provided, as defined in the attached claims.

The aim of the present invention is to overcome the disadvantages of the prior art.

A first aspect relates to a control device for a switching voltage regulator, the control device comprising an oscillator configured to generate a clock signal having a switching period; a voltage comparison circuit configured to generate a comparison signal indicative of a comparison between an input voltage of a switching circuit of the switching voltage regulator at an input node and an output voltage of the switching circuit at an output node; and a drive signal generator circuit configured to: generate a switch control signal to drive switches of the switching circuit as a function of an error between the output voltage and a nominal voltage, control a first control phase, a second control phase, and a third control phase within the switching period through, wherein the switch control signal controls a formation of a first current path between the input node and the output node through an inductive element, a formation of a second current path between the input node and a common node through the inductive element, the common node being a node of the switching circuit with a common reference potential, and a formation of a third current path between the output node and the common node through the inductive element, modify a sequence of the first control phase, the second control phase, and the third control phase within the switching period as a function of the comparison signal.

A second aspect relates to a switching voltage regulator comprising a switching circuit; and a control device configured to control the switching circuit, the control device comprising: an oscillator configured to generate a clock signal having a switching period; a voltage comparison circuit configured to generate a comparison signal indicative of a comparison between an input voltage of the switching circuit at an input node and an output voltage of the switching circuit at an output node; and a drive signal generator circuit configured to: generate a switch control signal to drive switches of the switching circuit as a function of an error between the output voltage and a nominal voltage, control a first control phase, a second control phase, and a third control phase within the switching period, wherein the switch control signal controls a formation of a first current path between the input node and the output node through an inductive element, a formation of a second current path between the input node and a common node through the inductive element, the common node being a node of the switching circuit with a common reference potential, and a formation of a third current path between the output node and the common node through the inductive element, modify a sequence of the first control phase, the second control phase, and the third control phase within the switching period as a function of the comparison signal.

A third aspect relates to a method for operating a switching voltage regulator, the method comprising generating, by an oscillator of a control device for operating a switching circuit of the switching voltage regulator, a clock signal having a switching period; generating, by a voltage comparison circuit of the control device, a comparison signal indicative of a comparison between an input voltage of the switching circuit at an input node and an output voltage of the switching circuit at an output node; generating, by a drive signal generator circuit of the control device, a switch control signal to drive switches of the switching circuit as a function of an error between the output voltage and a nominal voltage; controlling a first control phase, a second control phase, and a third control phase within the switching period, wherein the switch control signal controls a formation of a first current path between the input node and the output node through an inductive element, a formation of a second current path between the input node and a common node through the inductive element, the common node being a node of the switching circuit with a common reference potential, and a formation of a third current path between the output node and the common node through the inductive element; and modifying a sequence of the first control phase, the second control phase, and the third control phase within the switching period as a function of the comparison signal.

BRIEF DESCRIPTION OF THE DRAWINGS

For a better understanding of the present invention, embodiments thereof are now described, purely by way of non-limiting example, with reference to the attached drawings, wherein.

DETAILED DESCRIPTION OF ILLUSTRATIVE EMBODIMENTS

Figure 1:
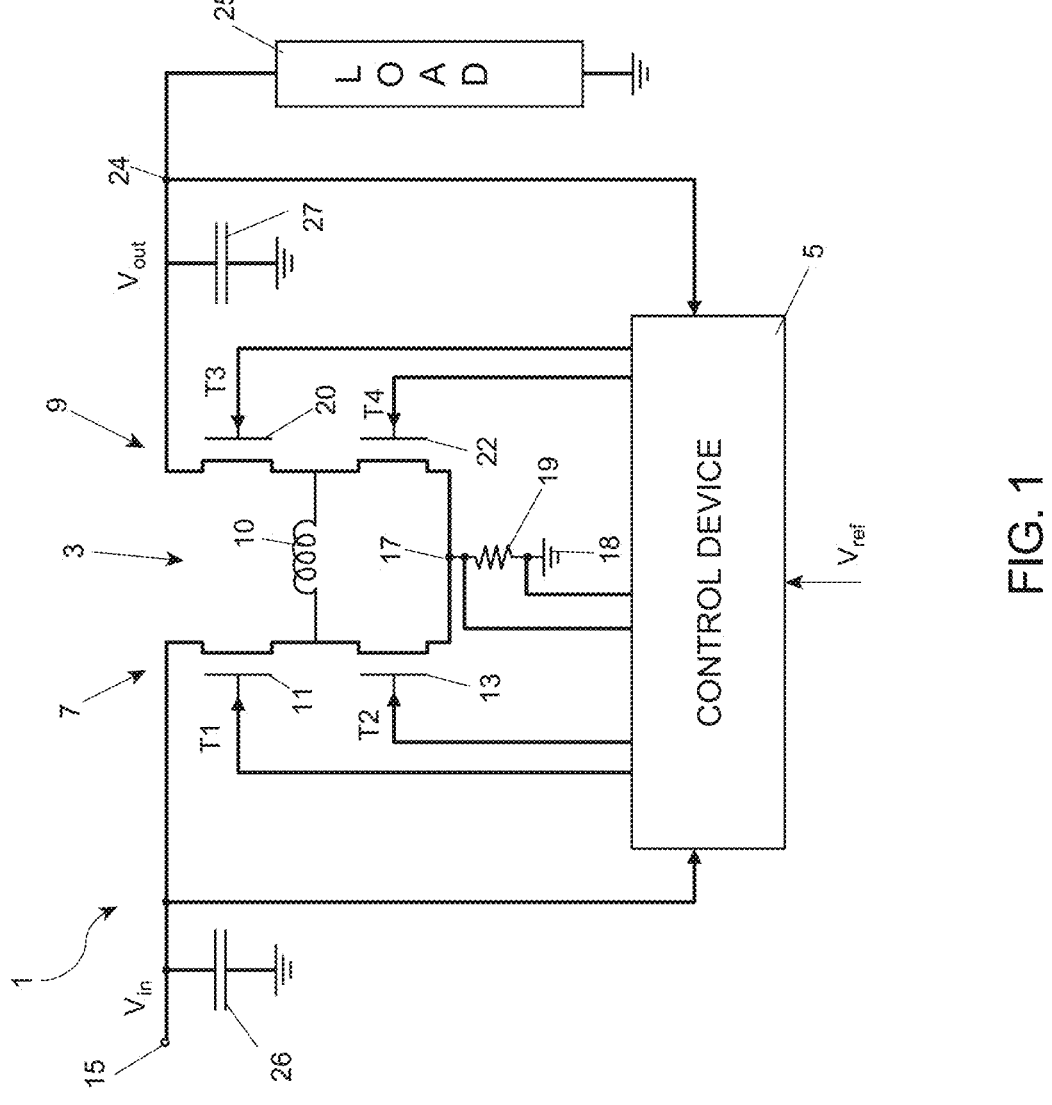
FIG. 1 shows a block diagram of a known switching voltage regulator.
Figure 3A:
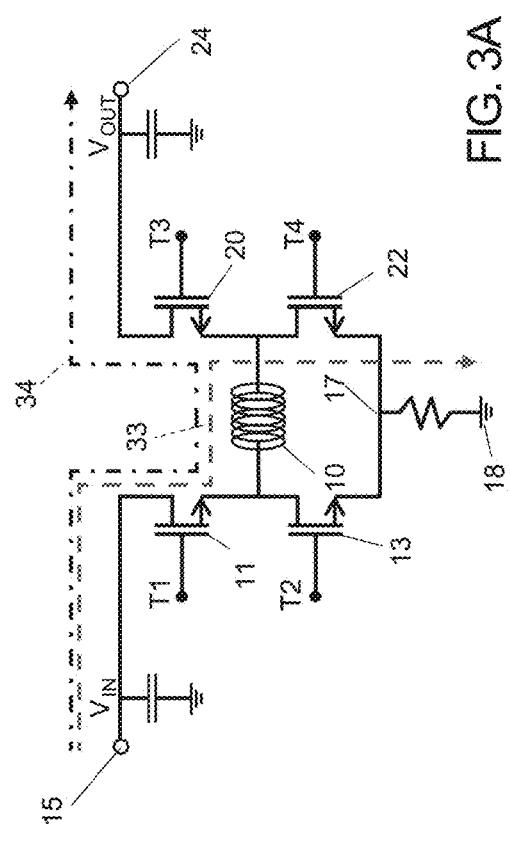
FIG. 3A shows a circuit diagram of the switching circuit of the regulator of FIG. 1, in use, in boost mode.
Figure 3B:
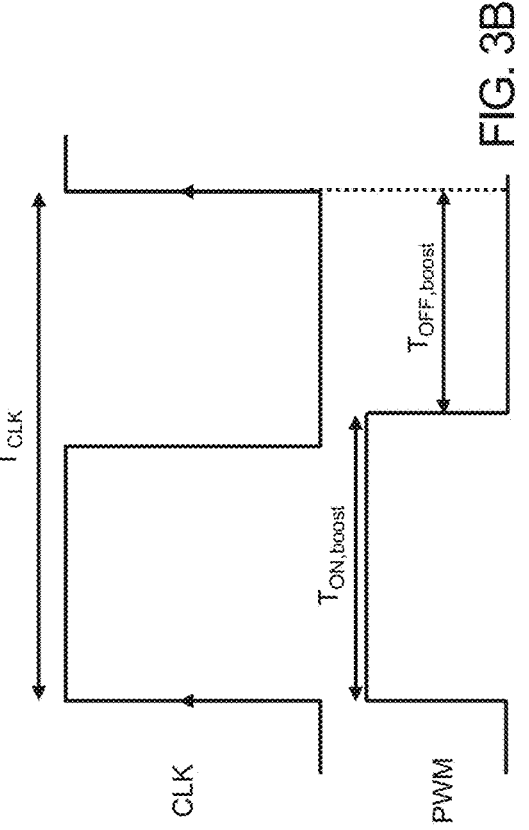
FIG. 3B shows waveforms of the regulator of FIG. 1, in use, in boost mode.
Figure 2A:
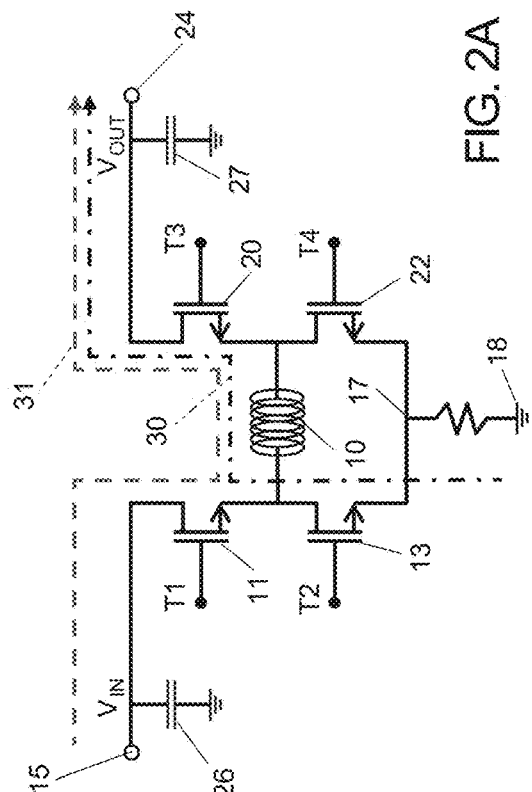
FIG. 2A shows a circuit diagram of a switching circuit of the regulator of FIG. 1, in use, in buck mode.
Figure 2B:
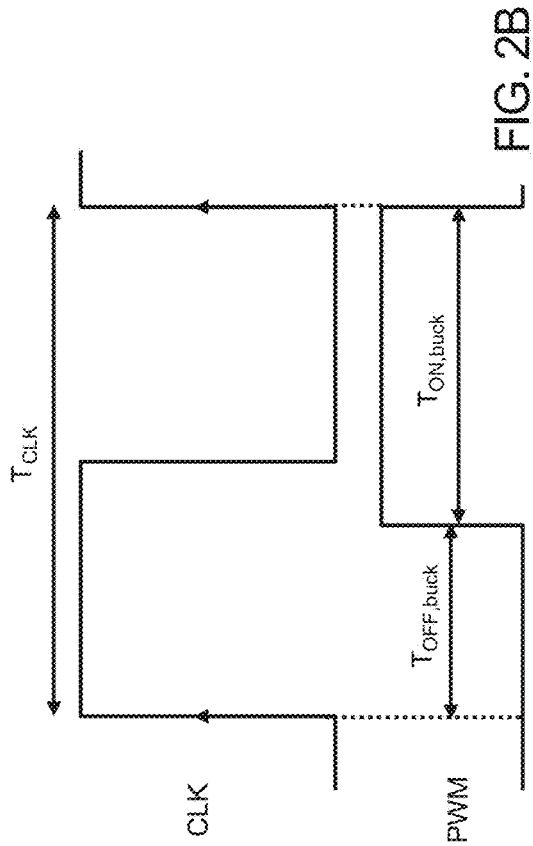
FIG. 2B shows waveforms of the regulator of FIG. 1, in use, in buck mode.
Figure 4:
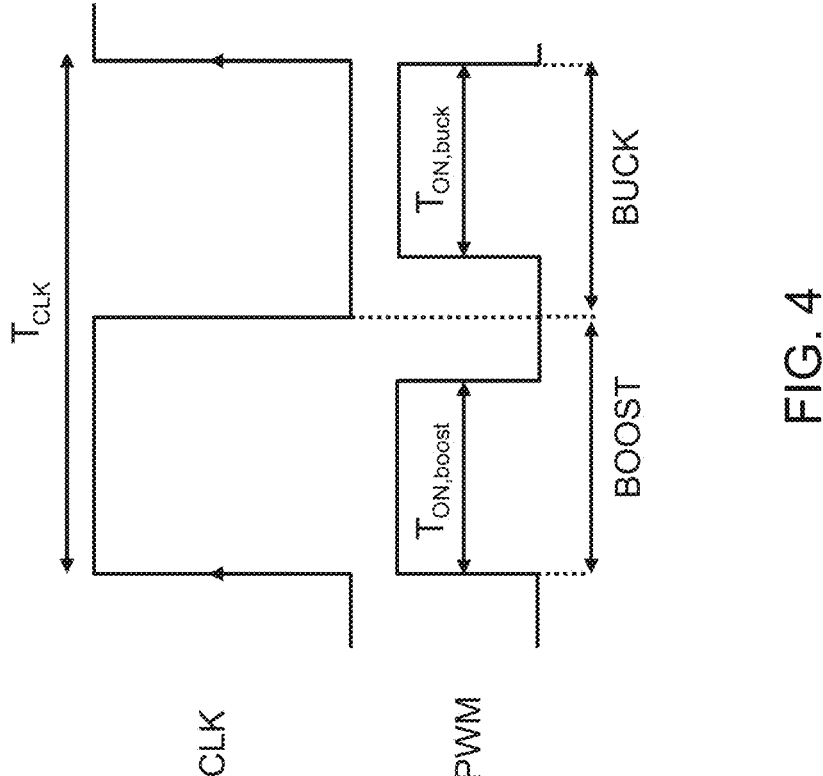
FIG. 4 shows waveforms of the regulator of FIG. 1, in use, in transition mode.
Figure 5:
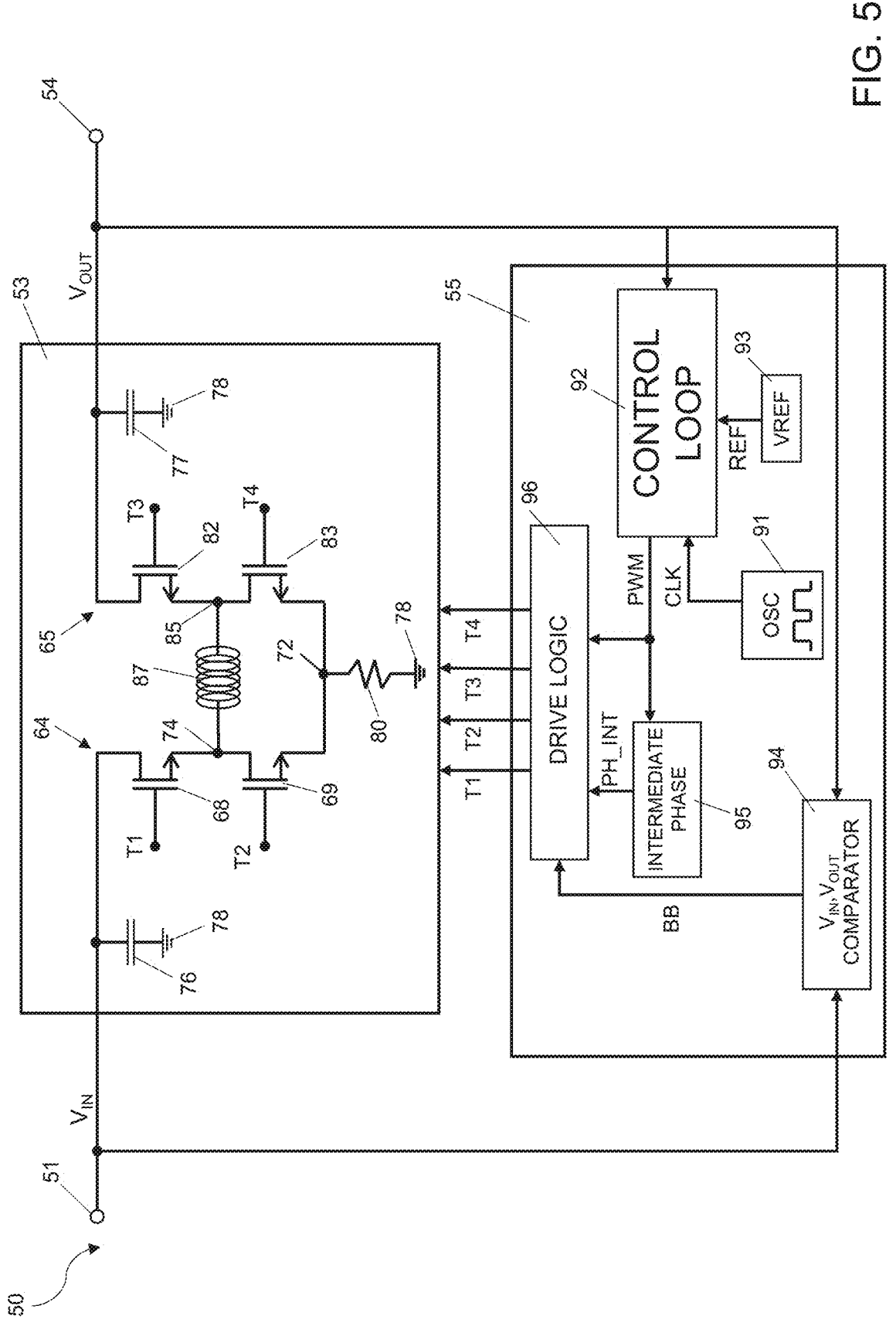
FIG. 5 shows a block diagram of a switching voltage regulator, according to one embodiment.

FIG. 5 shows a block diagram of a switching voltage regulator 50, hereinafter also simply referred to as regulator 50, comprising a switching circuit 53 and a control device 55, mutually coupled.

The regulator 50 has an input node 51, which receives an input voltage VIN, and an output node 54, which provides an output voltage $V_{OUT}$. The output node 54 may be coupled to a load, which is not shown here, which receives the output voltage $V_{OUT}$.

In detail, the regulator 50 is a DC-DC converter of the buck-boost type, configured to generate the output voltage $V_{OUT}$ starting from the input voltage $V_{IN}$, so that the output voltage $V_{out}$ is equal to a reference or nominal voltage $V_{REF}$, which may be chosen by a user as a function of the specific application.

The switching circuit 53 and the control device 55 may be integrated into a same die or formed into different dice. The switching circuit 53 is configured to regulate the output voltage $V_{OUT}$ to the reference value $V_{REF}$ for both $V_{IN} \leq V_{OUT}$ and $V_{IN} \geq V_{OUT}$, as discussed below in detail. The switching circuit 53 is a circuit having a plurality of switches and at least one inductive element. In this embodiment, the switching circuit 53 is a four-switch non-inverting circuit. In detail, the switching circuit 53 is formed by a first half-bridge 64 and a second half-bridge 65.

The first half-bridge 64 is formed by a first high-side switch 68 and a first low-side switch 69, here two N-MOS transistors, coupled in series between the input node 51 and a common node 72.

In detail, the first high-side switch 68 is coupled between the input node 51 and an intermediate node 74 of the first half-bridge 64 and the first low-side switch 69 is coupled between the intermediate node 74 of the first half-bridge 64 and the common node 72.

The switching circuit 53 receives the input voltage $V_{IN}$ with respect to a reference potential line (ground) 78.

An input capacitor 76 may be coupled between the input node 51 and the ground 78.

The second half-bridge 65 is formed by a second high-side switch 82 and a second low-side switch 83, also here two N-MOS transistors, coupled in series between the output node 54 and the common node 72.

In detail, the second high-side switch 82 is coupled between the output node 54 and an intermediate node 85 of the second half-bridge 65 and the second low-side switch 83 is coupled between the intermediate node 85 of the second half-bridge 65 and the common node 72.

The switching circuit 53 provides the output voltage $V_{OUT}$ with respect to the ground 78.

An output capacitor 77 may be coupled between the output node 54 and the ground 78.

The switching circuit 53 also comprises an inductor 87 having inductance L and coupled between the intermediate node 74 of the first half-bridge 64 and the intermediate node 85 of the second half-bridge 65.

The common node 72 is coupled to the ground 78 through a shunt resistor 80 having resistance $R_s$. The shunt resistor 80 is optional and may be helpful to obtain current control of the regulator 1.

The first high-side switch 68, the first low-side switch 69, the second high-side switch 82, and the second low-side switch 83 are each controlled by a respective switch control signal T1, T2, T3, and T4.

The control device 55 is coupled to the input node 51 and the output node 54.

The control device 55 generates the switch control signals T1, T2, T3, T4 (hereinafter also indicated as a whole by T1-T4) as a function of an error between the output voltage $V_{OUT}$ and the reference voltage $V_{REF}$, and of a comparison between the input voltage $V_{IN}$ and the output voltage $V_{OUT}$.

Figure 6:
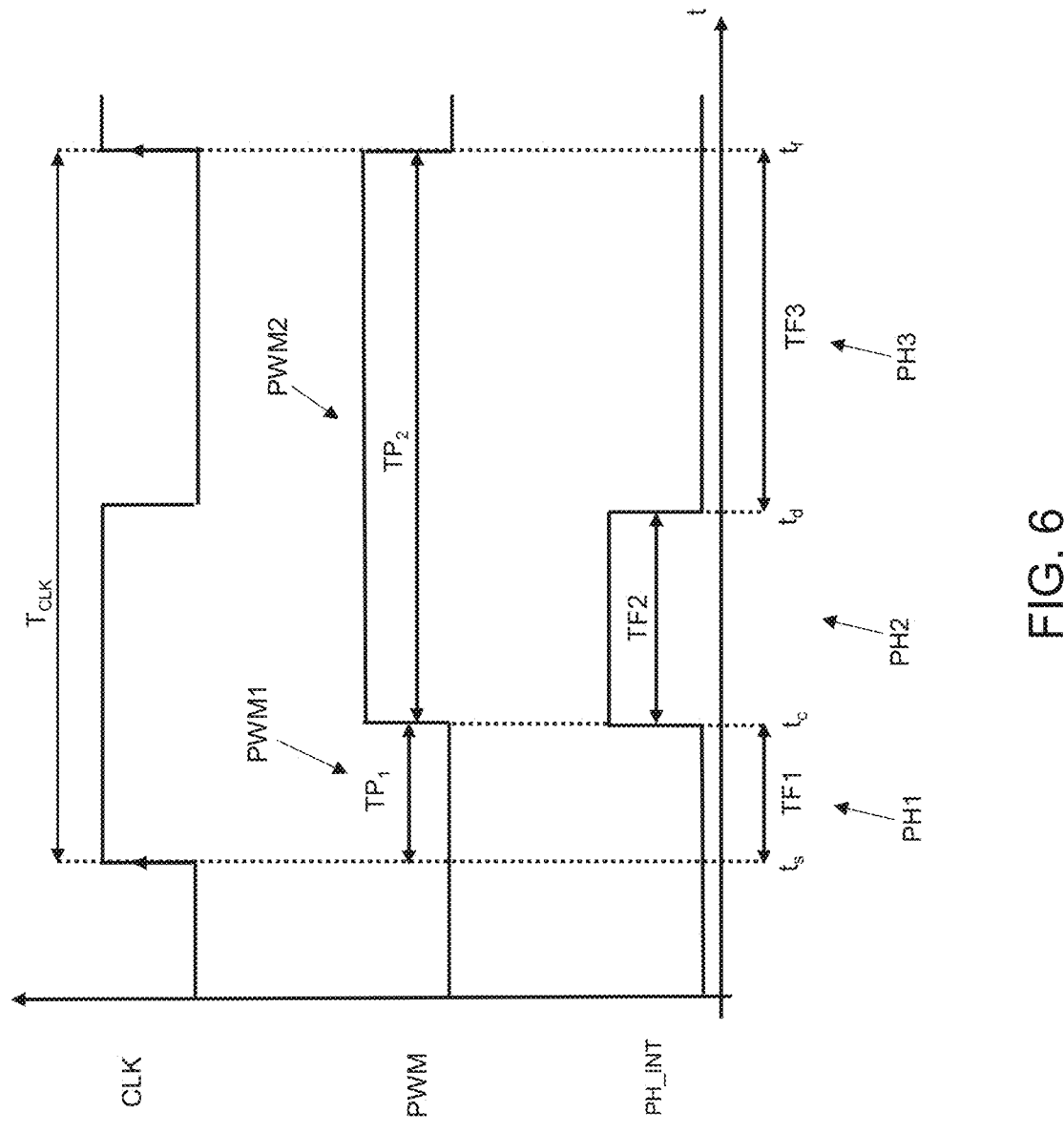
FIG. 6 shows waveforms of the regulator of FIG. 5, in use.

The control device 55 comprises an oscillator 91 which provides a clock signal CLK, for example a square-wave periodic signal in the example of FIG. 6, having a period of duration $T_{CLK}$.

The duration $T_{CLK}$ may be comprised, for example, between about 10 µs and a few hundred nanoseconds, according to the specific application.

In this embodiment, the clock signal CLK has a period of fixed duration $T_{CLK}$. However, the clock signal CLK may have a period of variable duration.

The period of the clock signal CLK defines a switching period, hereinafter referred to as CMT or $T_{CLK}$, of the regulator 50.

The control device 55 further comprises a (feedback) loop control circuit or module 92 which receives a signal, here the output voltage $V_{OUT}$, indicative of the output voltage $V_{OUT}$ and a signal REF indicative of the reference voltage $V_{REF}$, and provides a modulated signal PWM as a function of the error between the output voltage $V_{OUT}$ and the reference voltage $V_{REF}$.

In this embodiment, the control device 55 comprises a generator 93 that generates the signal REF. However, the loop control circuit 92 may receive the signal REF from an external user.

The modulated signal PWM is a pulse-width modulation signal having a duty cycle D within the switching period $T_{CLK}$.

The loop control circuit 92 regulates, in each switching period $T_{CLK}$, the duty cycle D of the modulated signal PWM as a function of the error between the output voltage $V_{OUT}$ and the reference voltage $V_{REF}$.

The modulated signal PWM has, within a switching period $T_{CLK}$, a first modulation phase PWM1, having duration $TP_1$, wherein it assumes a first value (for example low logic value in the example of FIG. 6), and a second modulation phase PWM2, having duration $TP_2$, wherein it assumes a second value (for example high logic value in the example of FIG. 6).

The loop control circuit 92 determines the switching instant ($t_c$ in FIG. 6) between the first and the second modulation phases PWM1, PWM2, and therefore the respective durations $TP_1$, $TP_2$ and, consequently, also the duty cycle D of the modulated signal PWM.

The duty cycle D of the modulated signal PWM depends on the durations $TP_1$ and $TP_2$. With reference to the period $T_{CLK}$ of FIG. 6, when the control device 55 performs a valley-type control, for example for $V_{IN} > V_{OUT}$, it may be $D = TP_2/(TP_1+TP_2)$. Conversely, when the control device 55 performs a peak-type control, for example for $V_{IN} < V_{OUT}$, it may be $D = TP_1/(TP_1+TP_2)$.

The loop control circuit 92 may regulate the duty cycle D of the modulated signal PWM according to a current or voltage control mode.

The control device 55 further comprises a voltage comparison circuit or comparator 94 which receives the input voltage $V_{IN}$ and the output voltage $V_{OUT}$ and provides, in response, a comparison signal BB indicative of a comparison between the input voltage $V_{IN}$ and the output voltage $V_{OUT}$. For example, the comparator 94 may provide the comparison signal BB as a function of a difference or a ratio between the output voltage $V_{OUT}$ and the input voltage $V_{IN}$.

In practice, the comparison signal BB indicates whether the input voltage $V_{IN}$ is greater than, lower than or equal to the output voltage $V_{OUT}$.

The control device 55 comprises an intermediate phase circuit or module 95 which provides an intermediate phase control signal PH_INT in response to the switching of the modulated signal PWM (instant $t_c$ in the example of FIG. 6) between the first value and the second value.

The intermediate phase control signal PH_INT may be a square-wave signal or other type of signal having a duration TF2 indicative of the duration of an intermediate phase of the regulator 50.

The intermediate phase circuit 95 may be configured such that the duration TF2 of the intermediate phase signal PH_INT is lower than or equal to a nominal duration.

The nominal duration may for example be programmed by a user during a calibration or initialization phase of the regulator 50. This allows a high configurability of the regulator 50 to be obtained.

The nominal duration may be indicated as a fraction of the duration $T_{CLK}$ of the switching period.

The nominal duration may be chosen as a function of the precision of the comparator 94 in comparing the input voltage $V_{IN}$ and the output voltage $V_{OUT}$, and of internal parameters of the control device 55 such as for example the blanking times. A nominal duration of the intermediate phase signal PH_INT comprised for example between 15% and 30% of the duration $T_{CLK}$ of the switching period may allow obtaining a correct regulation of the output voltage $V_{OUT}$ at the nominal value $V_{REF}$ in a wide range of operating scenarios of the regulator 50.

In this embodiment, the duration TF2 within the switching period $T_{CLK}$ is equal to the nominal duration. However, the intermediate phase circuit 95 may modify the duration TF2, as a function the duty cycle D of the signal PWM, so as to be, within the switching period $T_{CLK}$, lower than the nominal duration or even equal to zero.

The control device 55 comprises a drive logic circuit or module 96, which provides the switch control signals T1-T4 starting from the modulated signal PWM, the comparison signal BB, and the intermediate phase signal PH_INT.

In practice, the drive logic circuit 96, the intermediate phase circuit 95 and the feedback circuit 92 form a generator circuit of the switch control signals T1-T4.

In detail, in each switching cycle $T_{CLK}$, the control device 55 controls the regulator 50 in: an initial control phase PH1 of duration TF1 within the first modulation phase PWM1 (between the initial instant $t_s$ and the switching instant $t_c$ in the example of FIG. 6); an intermediate control phase PH2 of duration equal to the duration TF2 of the intermediate phase signal PH_INT (between the instants $t_c$ and $t_d$ in the example of FIG. 6); and a final control phase PH3 of duration TF3 (between the instants $t_d$ and $t_f$ in the example of FIG. 6).

In particular, the duration TF1 of the initial control phase PH1 may be lower than or equal to, as a first approximation, the duration TP1 of the first modulation phase PWM1.

The duration TF3 of the final control phase PH3 may be lower than or equal to, as a first approximation, the difference between the duration TP2 of the second modulation phase PWM2 and the duration TF2 of the intermediate phase signal PH_INT.

Figure 7:
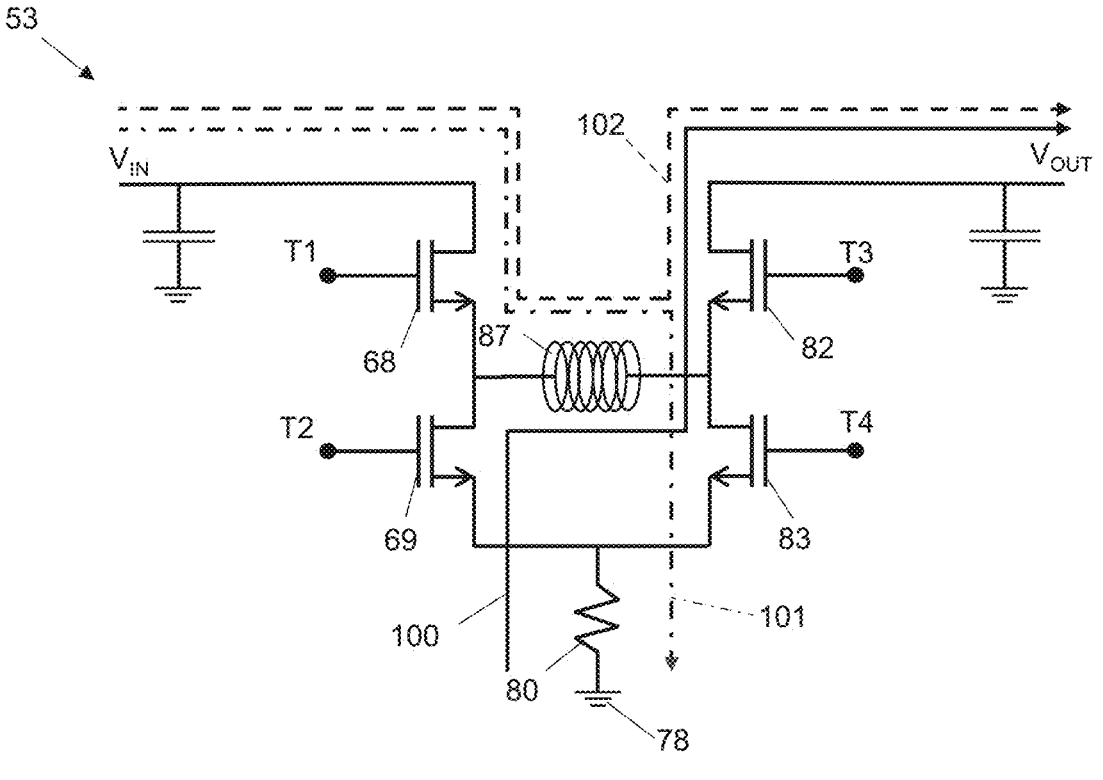
FIG. 7 shows a circuit diagram of a switching circuit of the regulator of FIG. 5, in use, in a first operating mode.

With reference to FIG. 7, the operation of the regulator 50 is described when the comparison signal BB indicates that the input voltage $V_{IN}$ is greater than the output voltage $V_{OUT}$.

In the initial control phase PH1, the drive logic circuit 96 generates the switch control signals T1-T4 so as to control the closing of the first low-side switch 69 and the second high-side switch 82, and the opening of the first high-side switch 68 and the second low-side switch 83.

In practice, if $V_{IN} > V_{OUT}$, in the initial control phase PH1, the control device 55 controls, in the switching circuit 53, the formation of an initial current path 100, indicated by a solid arrow in FIG. 7, between the ground 78 and the output node 54, through the inductor 87.

In detail, with reference to the shown embodiment of the switching circuit 53, the initial current path 100 comprises, in succession, the shunt resistor 80, the first low-side switch 69, the inductor 87, and the second high-side switch 82.

In the intermediate control phase PH2, the drive logic circuit 96 generates the switch control signals T1-T4 so as to control the closing of the first high-side switch 68 and the second low-side switch 83, and the opening of the first low-side switch 69 and the second high-side switch 82.

In practice, if $V_{IN} > V_{OUT}$, in the intermediate control phase PH2, the control device 55 controls, in the switching circuit 53, the formation of an intermediate current path 101, indicated by a dash-dot arrow in FIG. 7, between the input node 51 and the ground 78, through the inductor 87.

In detail, with reference to the shown embodiment of the switching circuit 53, the intermediate current path 101 comprises, in succession, the first high-side switch 68, the inductor 87, the second low-side switch 83, and the shunt resistor 80.

In the final control phase PH3, the drive logic circuit 96 generates the switch control signals T1-T4 so as to control the closing of the first high-side switch 68 and the second high-side switch 82, and the opening of the first low-side switch 69 and the second low-side switch 83.

In practice, if $V_{IN} > V_{OUT}$, in the final control phase PH3, the control device 55 controls, in the switching circuit 53, the formation of a final current path 102, indicated by a dashed arrow in FIG. 7, between the input node 51 and the output node 54, through the inductor 87.

In detail, with reference to the shown embodiment of the switching circuit 53, the final current path 102 comprises, in succession, the first high-side switch 68, the inductor 87 and the second high-side switch 83.

With reference to FIG. 7, it is possible to verify for example that, for $V_{IN} > V_{OUT}$ and D=TP2/(TP1+TP2), $$(\text{Vin} - \text{Vout}) \cdot [(D \cdot T_{CLK}) - TF2] - \text{Vout} \cdot (1 - D) \cdot T + \text{Vin} \cdot TF2 = 0,$$

$$\text{hence } \frac{\text{Vout}}{\text{Vin}} = \frac{D * T_{CLK}}{T_{CLK} - TF2} = \frac{TP2}{T_{CLK} - TF2}.$$

Figure 8:
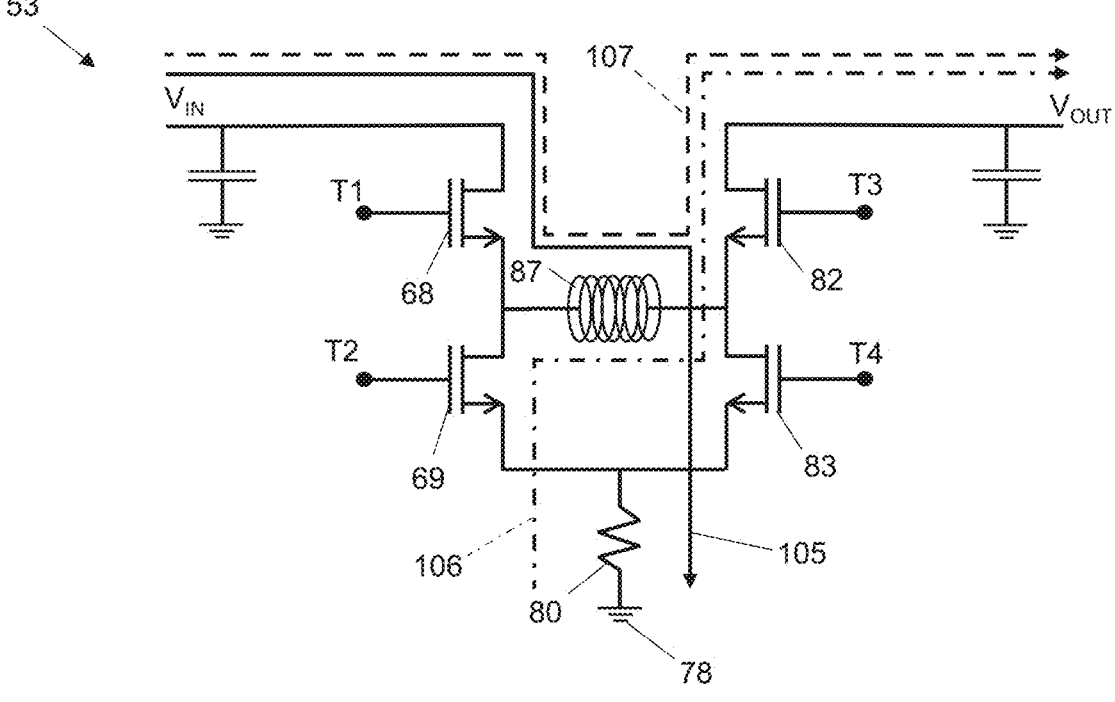
FIG. 8 shows a circuit diagram of the switching circuit of the regulator of FIG. 5, in use, in a second operating mode.

With reference to FIG. 8, the operation of the regulator 50 is described when the comparison signal BB indicates that the input voltage $V_{IN}$ is lower than the output voltage $V_{OUT}$.

In the initial control phase PH1, the drive logic circuit 96 generates the switch control signals T1-T4 so as to control the closing of the first high-side switch 68 and the second low-side switch 83, and the opening of the first low-side switch 69 and the second high-side switch 82.

In practice, if $V_{IN} < V_{OUT}$, in the initial control phase PH1, the control device 55 controls, in the switching circuit 53, the formation of an initial current path 105, indicated by a solid arrow in FIG. 8, between the input node 51 and the ground 78, through the inductor 87.

In detail, with reference to the shown embodiment of the switching circuit 53, the initial current path 105 comprises, in succession, the first high-side switch 68, the inductor 87, the second low-side switch 83, and the shunt resistor 80.

In the intermediate control phase PH2, the drive logic circuit 96 generates the switch control signals T1-T4 so as to control the closing of the first low-side switch 69 and the second high-side switch 82, and the opening of the first high-side switch 68 and the second low-side switch 83.

In practice, if $V_{IN}<V_{OUT}$, in the intermediate control phase PH2, the control device 55 controls, in the switching circuit 53, the formation of an intermediate current path 106, indicated by a dash-dot arrow in FIG. 8, between the ground 78 and the output node 54, through the inductor 87.

In detail, with reference to the shown embodiment of the switching circuit 53, the intermediate current path 106 comprises, in succession, the shunt resistor 80, the first low-side switch 69, the inductor 87, and the second high-side switch 82.

In the final control phase PH3, the drive logic circuit 96 generates the switch control signals T1-T4 so as to control the closing of the first high-side switch 68 and the second high-side switch 82, and the opening of the first low-side switch 69 and the second low-side switch 83.

In practice, if $V_{IN}<V_{OUT}$, in the final control phase PH3, the control device 55 controls, in the switching circuit 53, the formation of a final current path 107, indicated by a dashed arrow in FIG. 8, between the input node 51 and the output node 54, through the inductor 87.

In detail, with reference to the shown embodiment of the switching circuit 53, the final current path 107 comprises, in succession, the first high-side switch 68, the inductor 87, and the second high-side switch 82.

With reference to FIG. 8, it is possible to verify for example that, for $V_{IN}<V_{OUT}$ and D=TP1/(TP1+TP2), $$Vin\cdot(D\cdot T_{CLK})-Vout\cdot TF2+(Vin-Vout)[(1-D)*T_{CLK}-TF2]=0,$$

$$\text{hence } \frac{Vout}{Vin}=\frac{1}{1-D}*\frac{(T_{CLK}-TF2)}{T_{CLK}}.$$

If the comparison signal BB indicates that $V_{IN}=V_{OUT}$, then the control device 55 may be configured to control the switching circuit 53 according to what has been described with reference to FIG. 7 for $V_{IN}>V_{OUT}$ or, alternatively, according to what has been described with reference to FIG. 8 for $V_{IN}<V_{OUT}$, according to the specific implementation.

As emerges from the $V_{OUT}/V_{IN}$ formulas presented with reference to FIGS. 7 and 8, by choosing the duration TF2 of the intermediate control phase PH2, it is possible to define the ability of the control device 55 to control the output voltage $V_{OUT}$ at the reference value $V_{REF}$, even for $V_{OUT}\approx V_{IN}$.

In practice, the control device 55 modifies, within switching period $T_{CLK}$, the sequence (the order) of three distinct control phases, as a function of the comparison between the input voltage $V_{IN}$ and the output voltage $V_{OUT}$.

The Applicant has verified that the presence of the three control phases described above within a switching period $T_{CLK}$ allows the output voltage $V_{OUT}$ to be effectively regulated to the reference value $V_{REF}$, both for $V_{IN}>V_{OUT}$ and for $V_{IN}<V_{OUT}$, even in case $V_{IN}\approx V_{OUT}$. In practice, this allows the control device 55 to avoid using the transition mode described with reference to the known regulator 1.

In particular, the possibility of establishing the order of the three phases from the direct comparison between $V_{IN}$ and $V_{OUT}$, i.e. if $V_{IN}>V_{OUT}$ or if $V_{IN}<V_{OUT}$, allows avoiding the use of complex voltage thresholds to determine the operating modes of the regulator 50.

Using the initial, intermediate, and final control phase, whose order depends on the comparison between the input voltage $V_{IN}$ and the output voltage $V_{OUT}$, also allows for avoiding the onset of discontinuities in the control variables of the control device (for example in the feedback circuit 92), when the regulator 50 passes from $V_{IN}>V_{OUT}$ to $V_{IN}<V_{OUT}$ (and vice versa). Consequently, the regulator 50 is not subject to high current peaks through the inductor 87.

Figure 9:
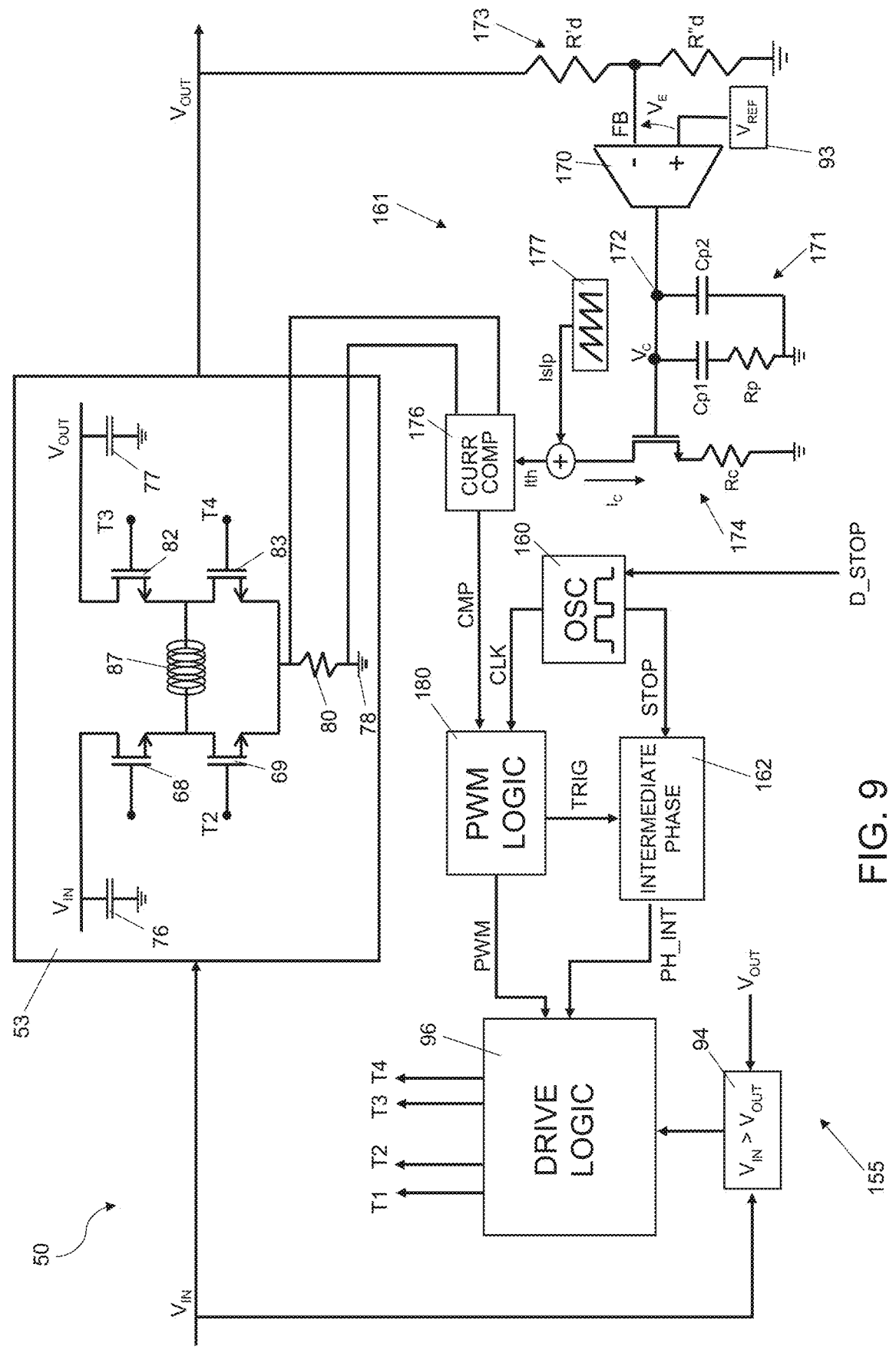
FIG. 9 shows a block diagram of a switching voltage regulator, according to a different embodiment.

FIG. 9 shows a different embodiment of the regulator 50 comprising the switching circuit 53 and a control device 155.

The control device 155 is configured to perform a current control of the regulator 50.

The control device 155 comprises the comparator 94, an oscillator 160, a loop control circuit 161, an intermediate phase generator circuit 162, and a drive logic circuit 96.

The oscillator 160 provides the clock signal CLK and a stop signal STOP.

The stop signal STOP, for example a square-wave logic signal, is indicative of a maximum modulation duration (or stop duration) stp. The maximum modulation duration stp may be indicative of a fraction of the switching period $T_{CLK}$.

For example, a value of the maximum modulation duration stp greater than or equal to 40% of the switching period $T_{CLK}$, in particular comprised between 50% and 65% of the switching period $T_{CLK}$, may ensure high regulation efficiency by the control device 55.

The oscillator 161 may receive a maximum duration signal D_STOP, for example from an external user of the regulator 50, for example during an initialization step, which sets the maximum modulation duration stp.

Figure 10:
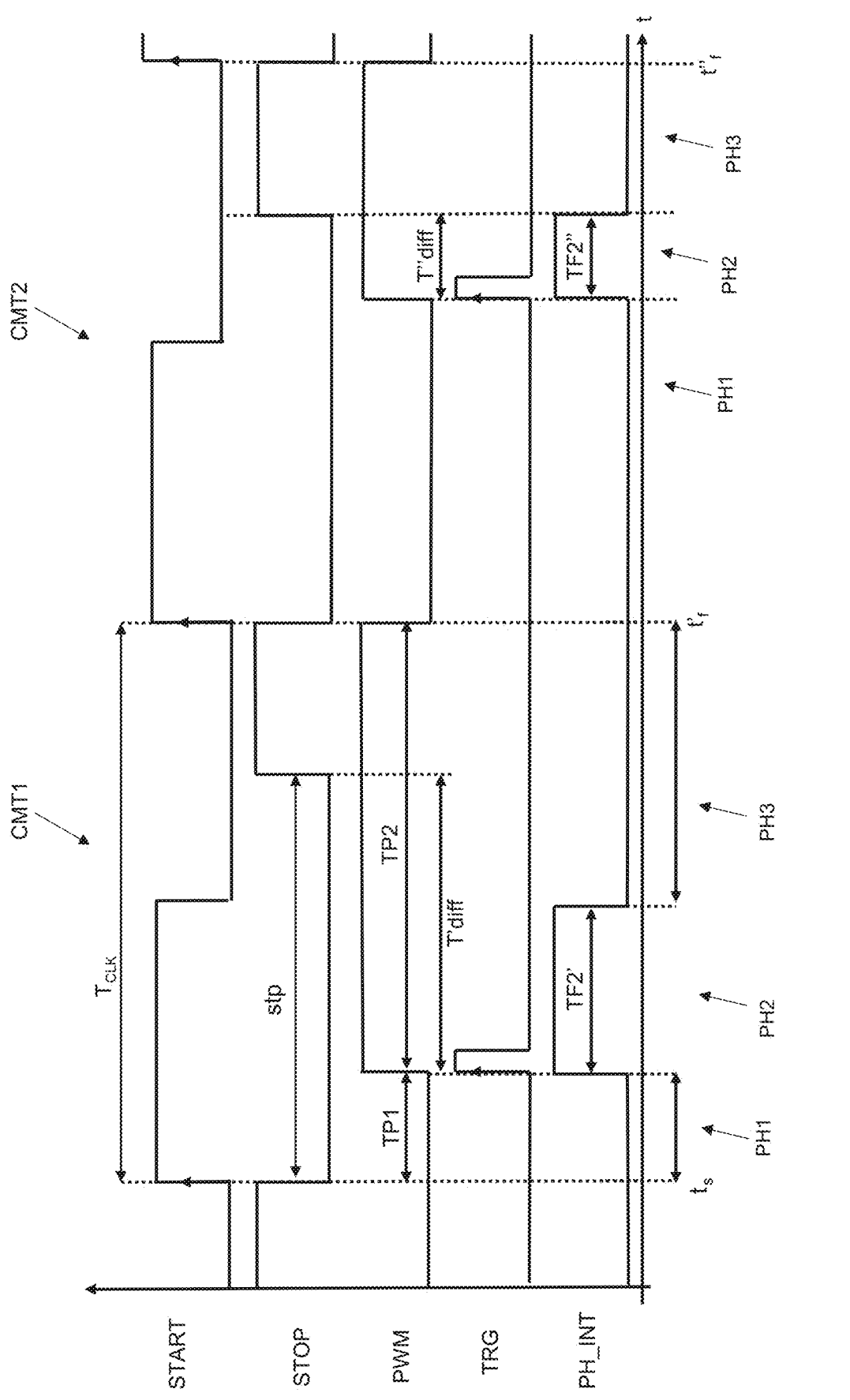
FIG. 10 shows waveforms of the regulator of FIG. 9, in use, according to one embodiment.
Figure 11:
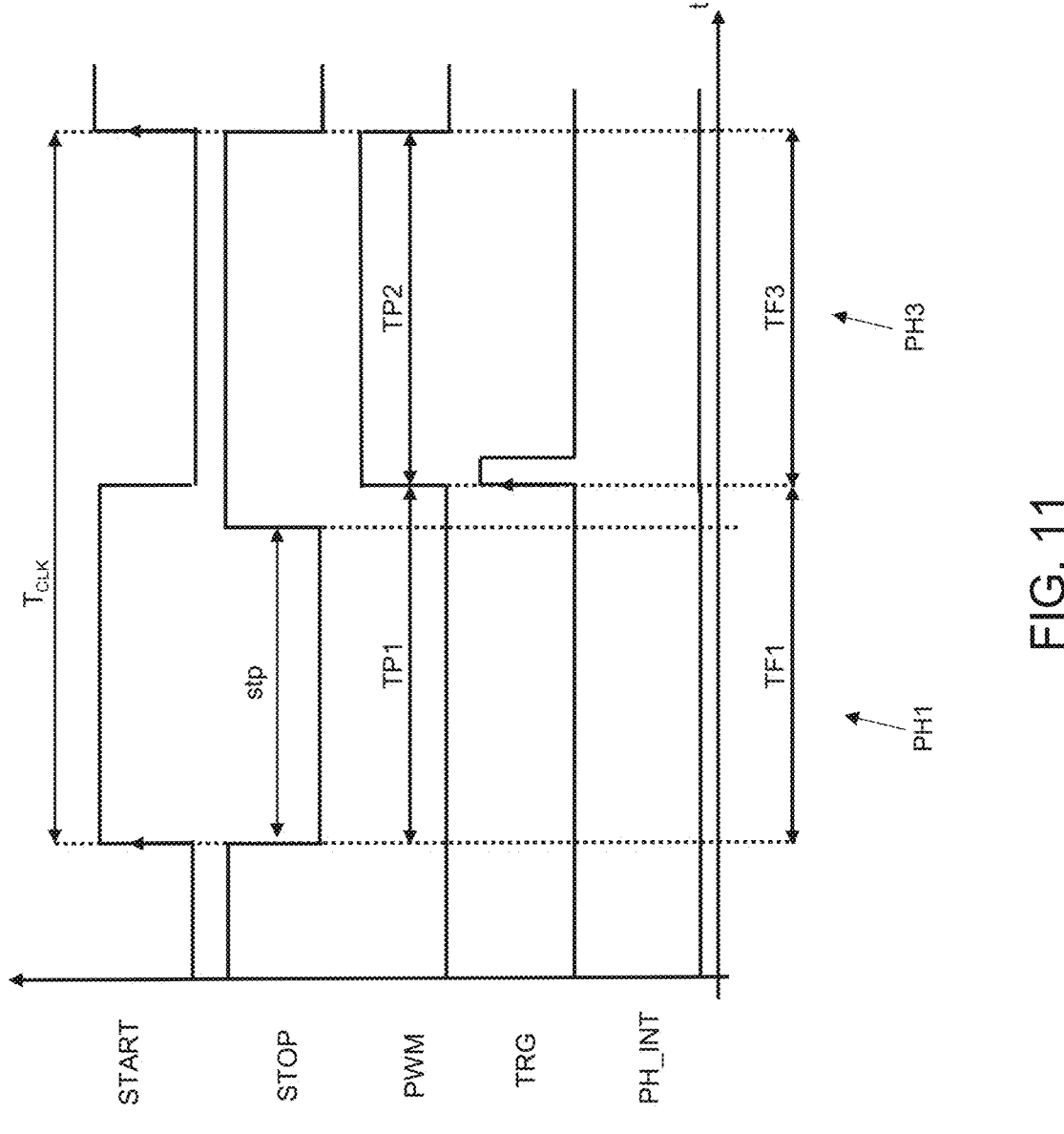
FIG. 11 shows waveforms of the regulator of FIG. 9, in use, according to one embodiment.

According to one embodiment, as shown in the examples of FIGS. 10 and 11, the oscillator 160 switches the stop signal STOP from a first value to a second value (from '0' to '1' in FIGS. 10 and 11) after a time interval equal to the maximum modulation duration stp from the beginning of the switching period.

In this embodiment, the loop control circuit 161 comprises an error amplifier, here an OTA 170, which receives a signal $V_E$ indicative of the error between the output voltage $V_{OUT}$ and the reference voltage $V_{REF}$; and a compensation network 171 coupled to an output 172 of the OTA 170.

In particular, in this embodiment, a voltage division circuit 173, for example here formed by two resistors R'd, R''d coupled in series, is coupled to the output node 54. The OTA 170 has an input coupled to an intermediate node of the voltage divider 173, at the voltage FB, and a second input from which it receives the signal REF indicative of the reference voltage $V_{REF}$.

The output 172 of the OTA 170, also referred to as the control node, is in use at a control voltage $V_C$. The loop control circuit 161 also comprises a voltage-to-current conversion circuit 174, for example, formed by a series circuit comprising a resistor Rc and an NMOS transistor, which converts the control voltage $V_C$ into a control current $I_C$.

In this embodiment, the compensation network 171 is of the second order and comprises two capacitors Cp1, Cp2 and a resistor Rp. However, the compensation network may be of different types, for example, of the first or third order, and comprise a different number of electrical elements, according to the specific desired transfer function between the error $V_E$ and the control voltage $V_C$.

The loop control circuit 161 also comprises a current comparator 176, which is coupled at input to the shunt resistor 80 of the switching circuit 53, and is configured to provide a transition signal CMP as a function of the comparison between the current which flows through the shunt resistor 80 and a threshold current Ith. For example, by measuring the current that flows through the shunt resistor 80, the control device 155 may perform a valley-type current control for $V_{IN}>V_{OUT}$ and a peak-type current control for $V_{IN}<V_{OUT}$.

The threshold current Ith is a function of the control current $I_c$ and, optionally, of one or more correction current values. For example, in the embodiment shown, the threshold current is given by the sum of the control current $I_C$ and a slope compensation current Islp, for example, a current ramp generated by a dedicated ramp generator 177.

A modulation logic circuit 180 of the loop control circuit 161 receives the transition signal CMP and the clock signal CLK and, in response, provides the modulated signal PWM.

In detail, the modulation logic circuit 180 switches, within the switching period $T_{CLK}$, the modulated signal PWM from the first to the second value, in response to the transition of the current comparator 176.

In this embodiment, the modulation logic circuit 180 also provides a trigger signal TRG in response to the switching of the modulated signal PWM. The trigger signal TRG is indicative of the switching of the modulated signal PWM from the first to the second value. For example, the trigger signal TRG may be a rising (or falling) edge of the modulated signal PWM itself. Alternatively, for design simplification, the trigger signal TRG may be one of the switch control signals T1-T4.

The intermediate phase circuit 162 receives the stop signal STOP and the trigger signal TRG and, in response, provides the intermediate phase signal PH_INT.

In practice, also here, the drive logic circuit 96, the intermediate phase circuit 162 and the feedback circuit 161 form a generator circuit of the switch control signals T1-T4.

With reference to the exemplary waveforms of FIG. 10, the intermediate phase circuit 162 switches the intermediate phase signal PH_INT to the high logic value in response to the reception of the trigger signal TRG, here in response to the rising edge of the trigger signal TRG.

The intermediate phase circuit 162 switches the intermediate phase signal PH_INT to the low logic value, within the switching period $T_{CLK}$, as a function of the stop duration stp and the switching instant of the modulated signal PWM.

In detail, FIG. 10, if the difference T'diff between the stop duration stp and the duration TP1 of the first modulation phase PWM1 of the modulated signal PWM is greater than the nominal duration TF2 of the intermediate phase signal PH_INT (switching period CMT1 between the instants $t_s$ and $t'_f$), then the duration TF2' of the intermediate control phase PH2 is equal to the nominal duration TF2.

If the difference T"diff between the stop duration stp and the duration TP1 of the first modulation phase PWM1 of the modulated signal PWM is lower than the nominal duration TF2 of the intermediate phase signal PH_INT (switching period CMT2 between the instants $t'_f$ and $t''_f$), then the duration of the intermediate control phase PH2 is equal to the difference T"diff, i.e. lower than the nominal duration TF2.

In other words, the intermediate phase circuit 162 regulates the duration of the intermediate control phase PH2 as a function of the time distance T'diff, T"diff between the event, here the rising edge, of the stop signal STOP and the switching instant of the modulated signal PWM between the first and the second modulation phases PWM1, PWM2.

In practice, the duration of the intermediate control phase PH2 is regulated as a function of the duty cycle D of the modulated signal PWM.

The regulation, in particular the decrease, of the duration of the intermediate control phase PH2 allows the ability of the control device 55 to regulate the output voltage $V_{OUT}$ to the reference voltage $V_{REF}$ to be optimized, even as the difference between the output voltage $V_{OUT}$ and the input voltage $V_{IN}$ increases.

According to one embodiment, the duration TF2 of the intermediate control phase PH2 may be regulated up to a minimum value comprised, for example, between 1 ns and 200 ns, in particular between 50 ns and 100 ns, so as to ensure safe operation of the drivers that generate the switch control signals T1-T4.

According to one embodiment, the intermediate phase circuit 162 may be configured, as shown by the exemplary waveforms of FIG. 11, not to activate the intermediate control phase PH2, if the switching of the signal PWM within the switching period is successive to the switching of the stop signal STOP.

In other words, the control device 155 does not command the execution of the intermediate control phase PH2 if the duration TP1 of the first modulation phase PWM1 is greater than the maximum modulation duration stp.

In practice, in this embodiment, the control device 155 modifies the order of the control phases so as not to perform the intermediate control phase PH2, and to perform the final control phase PH3 in response to the end of the initial control phase PH1. Therefore, in this case, the final control phase PH3 may have a greater duration with respect to what has been discussed with reference to FIG. 10 (for example at the limit equal to TP2). Furthermore, the transitions between the $V_{IN}>V_{OUT}$ and $V_{IN}<V_{OUT}$ control modes may occur without discontinuity of the control parameters of the control device 155.

This allows the output voltage $V_{OUT}$ to be effectively regulated to the reference voltage $V_{REF}$, even when the difference between the output voltage $V_{OUT}$ and the input voltage $V_{IN}$ is high, for example for duty cycles tending to the minimum (for example a few %) when $V_{IN}>V_{OUT}$ and to the maximum (for example about 60-70%) when $V_{IN}<V_{OUT}$.

Figure 12:
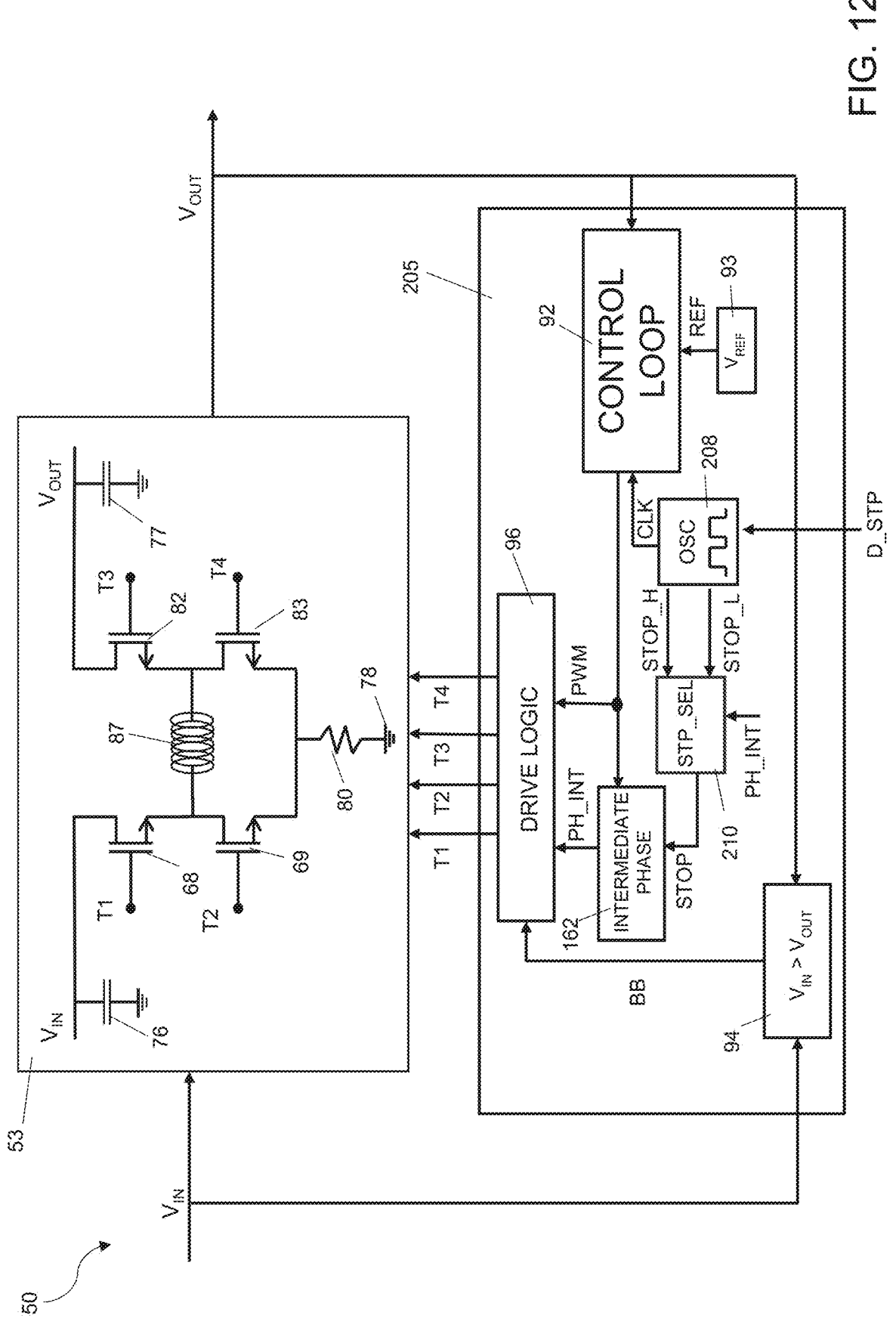
FIG. 12 shows a block diagram of a switching voltage regulator, according to a further embodiment.

FIG. 12 shows a further embodiment of the regulator 50, comprising the switching circuit 53 and a control device 205.

The control device 205 has a general structure similar to that of the control devices 55, 150 of FIGS. 5 and 9; consequently, common elements are indicated by the same reference numerals and are not further described in detail.

The control device 205 comprises also here the control loop circuit 92, the comparator 94, the drive logic circuit 96, the intermediate phase circuit 162.

In this embodiment, the oscillator, indicated by 208, provides a long stop signal STOP_H and a short stop signal STOP_L. The long stop signal STOP_H is indicative of a maximum modulation duration stp_h, and the short stop signal STOP_L is indicative of a maximum modulation duration stp_l, where stp_l<stp_h.

For example, the long stop signal STOP_H and the short stop signal STOP_L may be indicative of a portion of the switching period $T_{CLK}$ comprised between 40% and 65%.

The oscillator 208 may also receive here the signal D_STOP, for example, from an external user of the regulator 200, to set the durations stp_l and stp_h.

The control device 205 further comprises a stop selection circuit 210 which receives the long stop signal STOP_H, the short stop signal STOP_L, and the intermediate phase signal PH_INT and provides at output one of the long stop signal STOP_H and the short stop signal STOP_L.

Figures 13, 14:
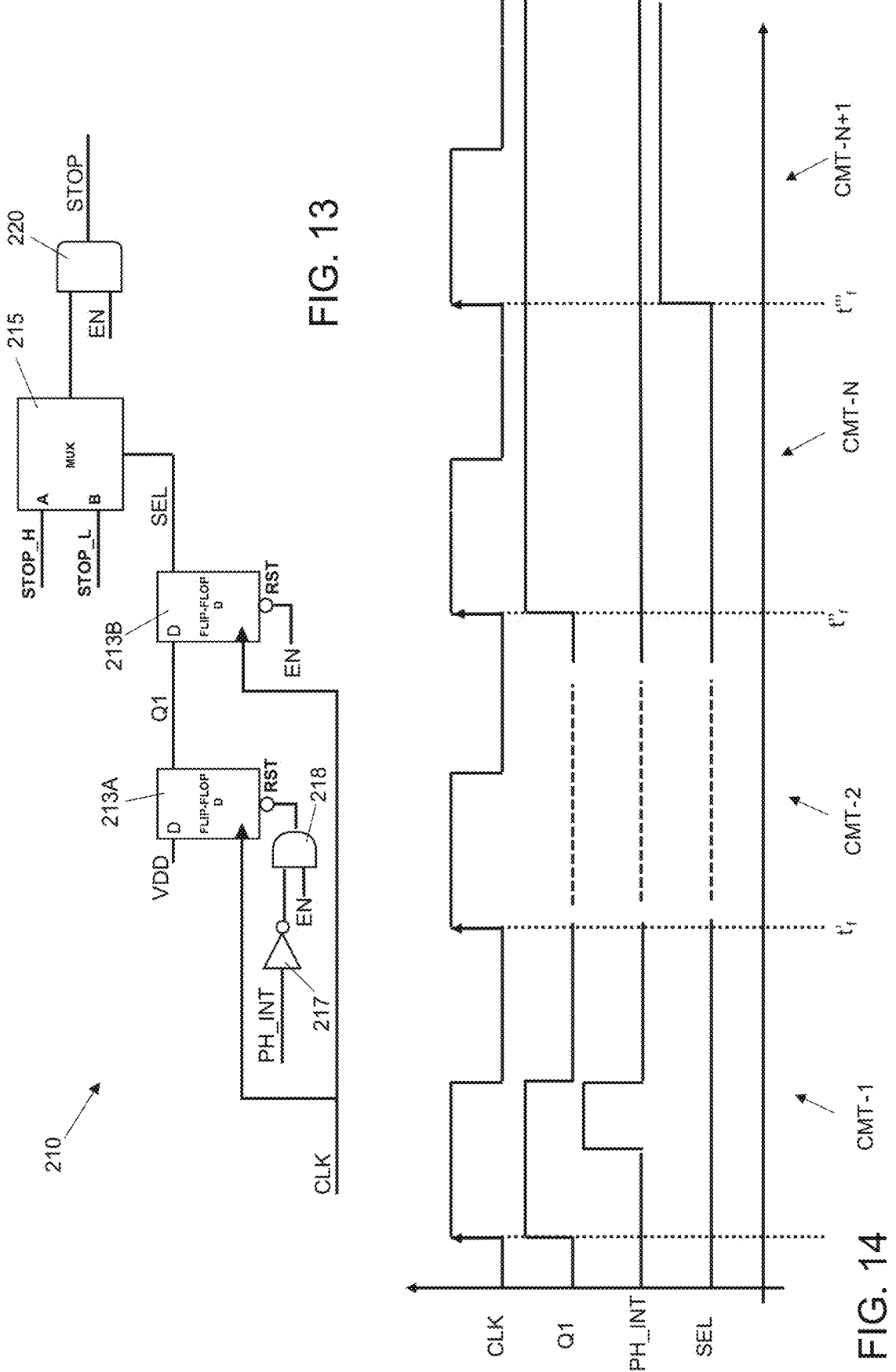
FIG. 13 shows a detailed circuit diagram of a portion of the regulator of FIG. 12, according to one embodiment.
FIG. 14 shows exemplary waveforms of the portion of FIG. 13, in use.

As shown in detail in FIG. 13, the stop selection circuit 210 comprises two or more memory elements, here two flip-flops 213A, 213B, cascaded with each other, and a multiplexer 215.

The output of the last flip-flop 213B forms a selection signal SEL.

The multiplexer 215 receives the long stop signal STOP_H, the short stop signal STOP_L and the selection signal SEL and provides one of the long stop signal STOP_H and the short stop signal STOP_L as a function of the selection signal SEL.

The flip-flop 213A is reset as a function of the intermediate phase signal PH_INT. In particular, in the embodiment shown, an inverter 217 receives the intermediate phase signal PH_INT. An AND logic gate 218 has an input coupled to the output of the inverter 217 and another input wherein it receives an enable signal EN. The flip-flop 213A has the reset input RST coupled to the output of the AND logic gate 218.

An AND logic gate 220 receives at input the enable signal EN and the stop signal at output from the multiplexer 215.

The enable signal EN is optional and may be useful to enable or disable the stop selection circuit 210, according to the specific application.

In use, with reference to the exemplary waveforms of FIG. 14, within a switching period CMT-1 the stop signal STOP is equal to one of the long stop signal STOP_H and the short stop signal STOP_L. For simplicity and purely by way of example, it is assumed that in the switching period CMT-1 the stop signal STOP is equal to the long stop signal STOP_H.

In the switching period CMT-1, the intermediate phase signal PH_INT is asserted. In practice, in the switching period CMT-1, the modulated signal PWM has switched before the long stop signal STOP_H.

At the end of the switching period CMT-1 (instant t'$_f$) the selection signal SEL does not switch (in particular here it maintains the low value).

Then, in the successive switching period CMT-2, the multiplexer 215 still provides the long stop signal STOP_H.

Again with reference to the example of FIG. 14, in a successive switching period CMT-N, the intermediate phase signal PH_INT is not asserted. In practice, in the switching period CMT-N, the modulated signal PWM has switched after the long stop signal STOP_H.

In this case, at the end of the switching period CMT-N (instant t'''$_f$), the selection signal SEL switches, in particular here assumes the high logic value. Then, the multiplexer 215 provides, for the successive switching period CMT-N+1, the short stop signal STOP_L.

The short stop signal STOP_L will be provided until, in a subsequent switching period here not shown, the switching of the modulated signal PWM occurs before the short stop signal STOP_L, thus causing the activation of intermediate control phase TF2.

In other words, the stop selection circuit 210 is configured to implement a hysteresis between the long stop signal STOP_H and the short stop signal STOP_L, in response to the non-activation of the intermediate control phase TF2 within a switching period.

This allows for preventing a slight variation in the duration TP1 of the modulated signal PWM between two successive switching periods CMT$_N$, CMT$_{N+1}$ from causing the activation of the intermediate control phase TF2. The control device 205 may, therefore, provide a high stability of the regulator 50.

In particular, the fact of using the short stop signal STOP_L in a switching period CMT$_N$, in response to the non-activation of the intermediate control phase TF2 in a preceding switching period CMT$_{N-1}$, may be useful to increase the stability of the regulator 50 when the input voltage V$_{IN}$ is lower than the output voltage V$_{OUT}$.

Finally, modifications and variations may be made to the regulator 50, the control devices 55, 155, 205 and the related control methods described and illustrated herein without thereby departing from the scope of the present invention, as defined in the attached claims.

For example, the comparator 94 may be implemented using a threshold comparator with hysteresis, in a per se known manner, which may be helpful to introduce a hysteresis in the comparison between V$_{IN}$ and V$_{OUT}$ and therefore preventing the comparator 94 from oscillating between the high value and the low value when V$_{IN}$ is exactly equal to V$_{OUT}$.

For example, the shunt resistor 80 may be arranged in a different position of the switching circuit 53 according to the specific application, for example, according to the type of current control (valley or peak) that is desired to be implemented for V$_{IN}$>V$_{OUT}$ and V$_{IN}$<V$_{OUT}$.

Alternatively, the shunt resistor 80 may be absent and one or more of the switches 68, 69, 82, 83 may be used, by the control device, as resistive elements from which to measure the current that flows, in use, into the switching circuit 53, for the implementation of a current control. In particular, this may be useful if one or more of the switches 68, 69, 82, 83 are integrated into the same die as the control device.

Figure 15:
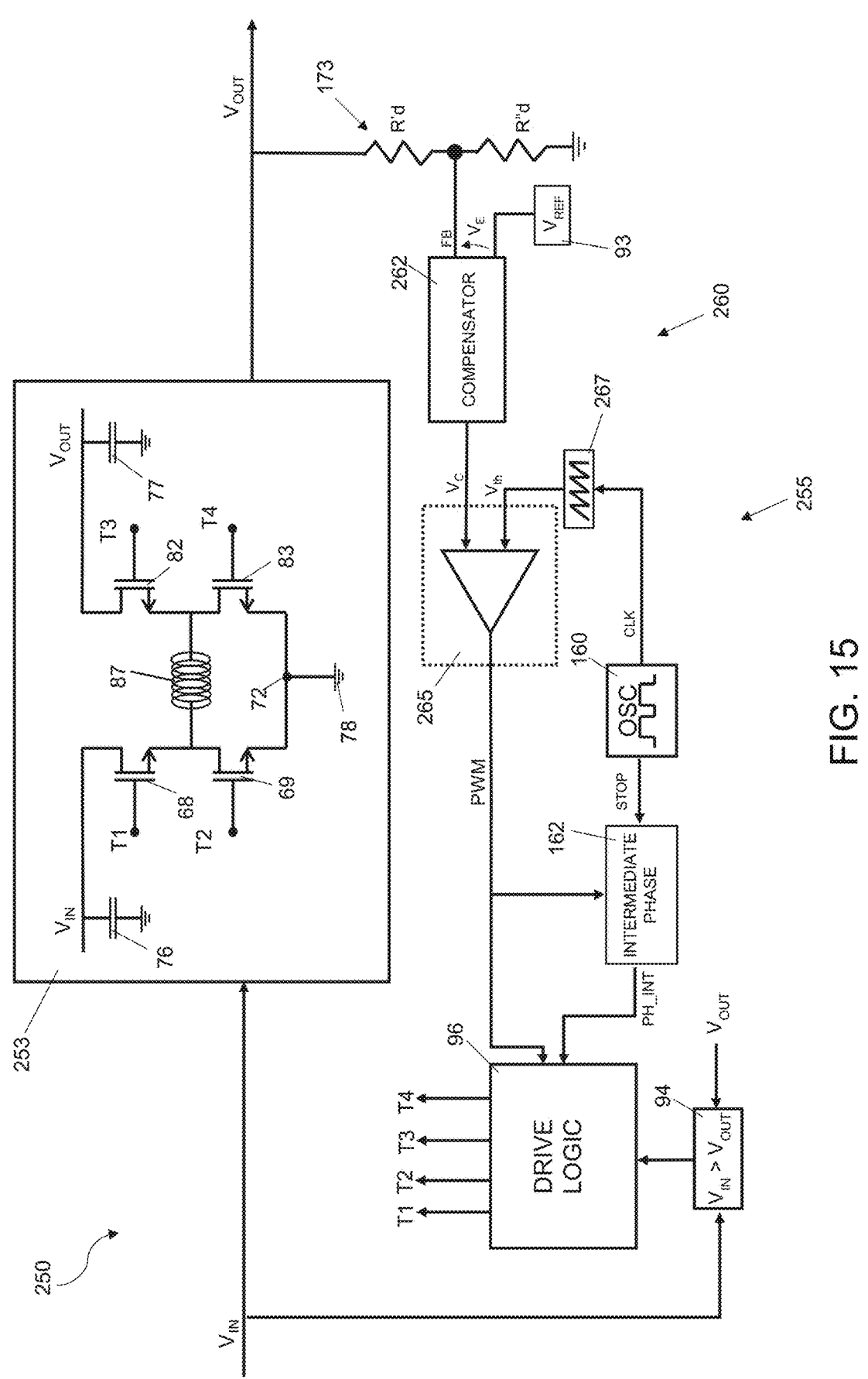
FIG. 15 shows a block diagram of a switching voltage regulator, according to a further embodiment.

Alternatively, the control device may be configured to perform a voltage control of the voltage regulator. For example, FIG. 15 shows an embodiment of the regulator, indicated by 250, comprising a switching circuit 253 and a control device 255.

Unlike the switching circuit 53, in the switching circuit 253 the shunt resistor 80 may be absent. In practice, the common node 72 is coupled directly to the ground 78.

The control device 255 has a general structure similar to that of the control device 155 of FIG. 9. In detail, the control device 255 comprises also here the comparator 94, the drive logic circuit 96, the intermediate phase circuit 162, the oscillator 160, and a feedback circuit here indicated by 260.

In the feedback circuit 260, a compensator 262 generates the control voltage V$_C$ starting from the error V$_E$ indicative of the difference between the output voltage V$_{OUT}$ and the reference voltage V$_{REF}$. The compensator 262 may be formed, for example, by an error amplifier, for example, an operational amplifier, and a compensation network. The feedback circuit 260 also comprises a modulator 265, for example, a voltage comparator, which compares the control voltage V$_C$ with a threshold voltage V$_{th}$ and provides, in response, the modulated signal PWM. The threshold voltage V$_{th}$, for example, has a sawtooth behavior, and is generated by a specific generator 267 controlled by the clock signal CLK.

For example, the control device may be formed by analog, digital, or mixed-signal circuits or modules, depending on the specific application and implementation.

Finally, the different embodiments described above may be combined to provide further solutions.

What is claimed is:

1. A control device for a switching voltage regulator, the control device comprising:

an oscillator configured to generate a clock signal having a switching period;

a voltage comparison circuit configured to generate a comparison signal indicative of a comparison between an input voltage of a switching circuit of the switching voltage regulator at an input node and an output voltage of the switching circuit at an output node; and a drive signal generator circuit configured to:

generate a switch control signal to drive switches of the switching circuit as a function of an error between the output voltage and a nominal voltage, control a first control phase, a second control phase, and a third control phase within the switching period, wherein the switch control signal controls a formation of a first current path between the input node and the output node through an inductive element during the first control phase, a formation of a second current path between the input node and a common node through the inductive element during the second control phase, the common node being a node of the switching circuit with a common reference potential, and a formation of a third current path between the output node and the common node through the inductive element during the third control phase, modify a sequence of the first control phase, the second control phase, and the third control phase within the switching period as a function of the comparison signal.

2. The control device of claim 1, wherein the drive signal generator circuit is configured to:

control an execution of the second control phase between the third control phase and the first control phase in response to the comparison signal indicating that the input voltage is greater than the output voltage, and control an execution of the third control phase between the second control phase and the first control phase in response to the comparison signal indicating that the input voltage is less than the output voltage.

3. The control device of claim 1, wherein the drive signal generator circuit comprises:

a feedback circuit configured to provide a pulse-width modulated signal defining a first modulation phase, a second modulation phase, and a third modulation phase within the switching period, wherein the pulse-width modulated signal has a first value at the first modulation phase, a second value at the second modulation phase, a duration of the first modulation phase and a duration of the second modulation phase being a function of an error between the output voltage and the nominal voltage, wherein the drive signal generator circuit is configured to control an initial control phase, an intermediate control phase, and a final control phase within the switching period, the initial control phase corresponding to the first modulation phase, the intermediate control phase corresponding to the switching of the pulse-width modulated signal between the first value and the second value, wherein the initial control phase, the intermediate control phase, and the final control phase correspond to the first control phase, the second control phase, and the third control phase, respectively.

4. The control device of claim 3, wherein the drive signal generator circuit is configured to regulate a duration of the intermediate control phase as a function of a duty cycle of the pulse-width modulated signal, the duty cycle indicative of a ratio between the duration of the first modulation phase and the duration of the second modulation phase.

5. The control device of claim 3, wherein the drive signal generator circuit is configured to regulate a duration of the intermediate control phase as a function of a duty cycle of the pulse-width modulated signal between a nominal value and a minimum value lower than the nominal value.

6. The control device of claim 3, wherein the drive signal generator circuit is configured to regulate a duration of the intermediate control phase as a function of a difference between a maximum modulation duration and the duration of the first modulation phase, wherein the maximum modulation duration is less than or equal to the duration of the switching period.

7. The control device of claim 6, wherein the oscillator is configured to generate a stop signal within the switching period having an event indicative of the maximum modulation duration, and wherein the drive signal generator circuit is configured to:

receive the stop signal, and regulate the duration of the intermediate control phase as a function of a time distance between the event of the stop signal and the switching of the pulse-width modulated signal.

8. The control device of claim 7, wherein the drive signal generator circuit is configured to:

command an execution of the intermediate control phase within the switching period in response to the duration of the first modulation phase being within the switching period being less than the maximum modulation duration, and not to command an execution of the intermediate control phase within the switching period in response to the duration of the first modulation phase being greater than the maximum modulation duration.

9. The control device of claim 6, wherein the control device is configured to:

receive a maximum duration signal indicative of the maximum modulation duration; and set the maximum modulation duration as a function of the maximum duration signal.

10. The control device of claim 6, wherein the maximum modulation duration is a first maximum modulation duration, wherein the oscillator is configured to:

generate a first stop signal indicative of the first maximum modulation duration, and generate a second stop signal indicative of a second maximum modulation duration different from the first maximum modulation duration, wherein the drive signal generator circuit is configured to:

compare the duration of the first modulation phase with the first maximum modulation duration in a first switching period, and compare the duration of the first modulation phase with the second maximum modulation duration in a second switching period in response to the duration of the first modulation phase being greater than the first maximum modulation duration, the second switching period following the first switching period.

11. The control device of claim 10, wherein the first maximum modulation duration is greater than the second maximum modulation duration.

12. A switching voltage regulator comprising:

a switching circuit; and a control device configured to control the switching circuit, the control device comprising:

an oscillator configured to generate a clock signal having a switching period;

a voltage comparison circuit configured to generate a comparison signal indicative of a comparison between an input voltage of the switching circuit at an input node and an output voltage of the switching circuit at an output node; and a drive signal generator circuit configured to:
  generate a switch control signal to drive switches of the switching circuit as a function of an error between the output voltage and a nominal voltage, control a first control phase, a second control phase, and a third control phase within the switching period, wherein the switch control signal controls a formation of a first current path between the input node and the output node through an inductive element during the first control phase, a formation of a second current path between the input node and a common node through the inductive element during the second control phase, the common node being a node of the switching circuit with a common reference potential, and a formation of a third current path between the output node and the common node through the inductive element during the third control phase, modify a sequence of the first control phase, the second control phase, and the third control phase within the switching period as a function of the comparison signal.

13. The switching voltage regulator of claim 12, wherein the switching circuit is a four-switch non-inverting switching circuit.

14. The switching voltage regulator of claim 12, wherein the drive signal generator circuit is configured to:
  control an execution of the second control phase between the third control phase and the first control phase in response to the comparison signal indicating that the input voltage is greater than the output voltage, and
  control an execution of the third control phase between the second control phase and the first control phase in response to the comparison signal indicating that the input voltage is less than the output voltage.

15. The switching voltage regulator of claim 12, wherein the drive signal generator circuit comprises:
  a feedback circuit configured to provide a pulse-width modulated signal defining a first modulation phase, a second modulation phase, and a third modulation phase within the switching period,
  wherein the pulse-width modulated signal has a first value at the first modulation phase, a second value at the second modulation phase, a duration of the first modulation phase and a duration of the second modulation phase being a function of an error between the output voltage and the nominal voltage,
  wherein the drive signal generator circuit is configured to control an initial control phase, an intermediate control phase, and a final control phase within the switching period, the initial control phase corresponding to the first modulation phase, the intermediate control phase corresponding to the switching of the pulse-width modulated signal between the first value and the second value,
  wherein the initial control phase, the intermediate control phase, and the final control phase correspond to the first control phase, the second control phase, and the third control phase, respectively.

16. A method for operating a switching voltage regulator, the method comprising:
  generating, by an oscillator of a control device for operating a switching circuit of the switching voltage regulator, a clock signal having a switching period;
  generating, by a voltage comparison circuit of the control device, a comparison signal indicative of a comparison between an input voltage of the switching circuit at an input node and an output voltage of the switching circuit at an output node;
  generating, by a drive signal generator circuit of the control device, a switch control signal to drive switches of the switching circuit as a function of an error between the output voltage and a nominal voltage;
  controlling a first control phase, a second control phase, and a third control phase within the switching period, wherein the switch control signal controls a formation of a first current path between the input node and the output node through an inductive element during the first control phase, a formation of a second current path between the input node and a common node through the inductive element during the second control phase, the common node being a node of the switching circuit with a common reference potential, and a formation of a third current path between the output node and the common node through the inductive element during the third control phase; and
  modifying a sequence of the first control phase, the second control phase, and the third control phase within the switching period as a function of the comparison signal.

17. The method of claim 16, further comprising:
  controlling, by the drive signal generator circuit, an execution of the second control phase between the third control phase and the first control phase in response to the comparison signal indicating that the input voltage is greater than the output voltage, and
  controlling, by the drive signal generator circuit, an execution of the third control phase between the second control phase and the first control phase in response to the comparison signal indicating that the input voltage is less than the output voltage.

18. The method of claim 16, further comprising:
  generating, by a feedback circuit of the drive signal generator circuit, a pulse-width modulated signal defining a first modulation phase, a second modulation phase, and a third modulation phase within the switching period,
  wherein the pulse-width modulated signal has a first value at the first modulation phase, a second value at the second modulation phase, a duration of the first modulation phase, and a duration of the second modulation phase being a function of an error between the output voltage and the nominal voltage,
  controlling, by the drive signal generator circuit, an initial control phase, an intermediate control phase, and a final control phase within the switching period, the initial control phase corresponding to the first modulation phase, the intermediate control phase corresponding to the switching of the pulse-width modulated signal between the first value and the second value,
  wherein the initial control phase, the intermediate control phase, and the final control phase correspond to the first control phase, the second control phase, and the third control phase, respectively.

19. The method of claim 18, further comprising regulating, by the drive signal generator circuit, a duration of the intermediate control phase as a function of a duty cycle of the pulse-width modulated signal, the duty cycle indicative of a ratio between the duration of the first modulation phase and the duration of the second modulation phase.

20. The method of claim 18, further comprising regulating, by the drive signal generator circuit, a duration of the intermediate control phase as a function of a duty cycle of the pulse-width modulated signal between a nominal value and a minimum value lower than the nominal value.

\* \* \* \* \*